US008028128B2

(12) United States Patent
Averill et al.

(10) Patent No.: US 8,028,128 B2
(45) Date of Patent: Sep. 27, 2011

(54) METHOD FOR INCREASING CACHE DIRECTORY ASSOCIATIVITY CLASSES IN A SYSTEM WITH A REGISTER SPACE MEMORY

(75) Inventors: Duane A. Averill, Rochester, MN (US); Herman L. Blackmon, Moline, IL (US); Joseph A. Kirscht, Rochester, MN (US); David A. Shedivy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 11/869,901

(22) Filed: Oct. 10, 2007

(65) Prior Publication Data

US 2009/0100229 A1    Apr. 16, 2009

(51) Int. Cl.
*G06F 12/00* (2006.01)

(52) U.S. Cl. .......................... 711/128; 711/141; 711/170

(58) Field of Classification Search .................. 711/128, 711/141, 170
See application file for complete search history.

(56) References Cited

U.S. PATENT DOCUMENTS 6,138,209 A * 10/2000 Krolak et al. .................. 711/128
6,192,458 B1 * 2/2001 Arimilli et al. ................ 711/220
* cited by examiner

*Primary Examiner* — Kevin Ellis
*Assistant Examiner* — Mehdi Namazi
(74) *Attorney, Agent, or Firm* — Bockhop & Associates LLC

(57) ABSTRACT

In a method of managing a cache directory in a memory system, an original system address is presented to the cache directory when corresponding associativity data is allocated to an associativity class in the cache directory. The original system address is normalized by removing address space corresponding to a memory hole, thereby generating a normalized address. The normalized address is stored in the cache directory. The normalized address is de-normalized, thereby generating a de-normalized address, when the associativity data is cast out of the cache directory to make room for new associativity data. The de-normalized address is sent to the memory system for coherency management.

15 Claims, 3 Drawing Sheets

METHOD FOR INCREASING CACHE DIRECTORY ASSOCIATIVITY CLASSES IN A SYSTEM WITH A REGISTER SPACE MEMORY

BACKGROUND OF THE INVENTION

1. Field of the Invention

The present invention relates to digital systems and, more specifically, to a system used to manage a cache directory.

2. Description of the Prior Art

A cache is a collection of data that stores, in a relatively fast memory system, duplicates of data stored elsewhere in a relatively slower memory system. Frequently accessed data can be stored for rapid access in a cache. During processing of the data, cached data can be accessed rather than the original data. Once the cached data has not been accessed for a given amount of time, the cached data is written back to its original memory location and room in the cache is made for new data. Processing speed can be improved significantly through use of a cache.

As shown in FIG. 1, a data cache 10 includes a plurality of cache lines 20, each of which includes an address field 22 and a data field 24. The address field 22 stores the address in main memory of the data that is stored in the data field 24. The address can point to anywhere in the memory space 26 of the system. The memory space 26 can include both physical memory and registers. Sometimes the address space corresponding to registers is referred to as a memory "hole."

Use of a cache presents a challenge in multiprocessor systems. This is because each processor may use its own cache, but all of the processors may share the same main memory. In this case, if two different processors access the same data, but operate on it in their own caches, then the data can become incoherent.

To solve this problem, most multiprocessors systems employ a cache directory 30 to keep track of how cached data is being accessed by different processors. A cache directory includes a plurality of associativity classes 32, each of which includes an address field 34 (that corresponds to an address field 22 in a cache line 20) and a coherency data field 36 that stores data regarding the currency of the data stored in a give cache line 20. By accessing the cache directory 30 a processor can determine if data stored in a cache line 20 is current, or if the processor need to access main memory to update the cache data.

Directory based coherence protocols are extremely common in cache-coherent distributed memory (NUMA) computer systems. A scalability directory records memory blocks (i.e., cache lines) from one node's local memory which are present in the caches of remote nodes. Commonly, the structure of the scalability directory is an array with multiple associativity classes. Minimally, each associativity class contains an address tag field as well as a coherence state associated with each cache line. The scalability directory's size directly limits how much local memory may be cached by remote nodes.

In general, the address tag must be as big as the largest system address that the scalability directory can process. One method for reducing the size of the address tag subtracts the local node's base address. For example, the system address map may support 1 TB of memory (40-bit address). However, the memory installed on a given node may be limited (by DIMM technology, etc.) to a smaller amount. If the local node's base address is subtracted, the most significant address tag bits may be eliminated.

It is also a known feature of system memory maps to define an address range that is used to access physical registers within the hardware or on an I/O device. This address range is referred to as an address "hole" because there is no physical memory associated with it in the main memory DRAMs. For example, in one design point, the memory hole is defined as ending on the 4 GB address boundary and extending downward. In other systems, the size of the memory hole ranges from 64 MB to 4 GB. Since there is no physical memory associated with the hole, the system address must be normalized to remove the hole before the DRAMs are accessed thus allowing the DRAMs to be fully utilized.

Therefore, there is a need for a cache management system that improves performance by reducing the number of bits required for the address tag in a directory.

SUMMARY OF THE INVENTION

The disadvantages of the prior art are overcome by the present invention which, in one aspect, is a method of managing a cache directory in a memory system. An original system address is presented to the cache directory when corresponding associativity data is allocated to an associativity class in the cache directory. The original system address is normalized by removing address space corresponding to a memory hole, thereby generating a normalized address. The normalized address is stored in the cache directory. The normalized address is de-normalized, thereby generating a de-normalized address, when the associativity data is cast out of the cache directory to make room for new associativity data. The de-normalized address is sent to the memory system for coherency management.

In another aspect, the invention is a method of increasing cache directory associativity classes, in which each associativity class includes a memory address. If the address has a value that is greater that the maximum address of the memory hole, then a size of the memory hole is subtracted from the address, thereby generating a normalized address. If the address has a value that is not greater that the maximum address of the memory hole, then higher order address bits corresponding to a size of the memory hole are removed, thereby generating the normalized address. The normalized address is stored in the cache directory.

In yet another aspect, the invention is an apparatus for managing a cache directory in a memory system that includes a memory hole size input, a normalizing circuit, a storage circuit, a de-normalizing circuit and a transmission circuit. The normalizing circuit is configured to normalize an original system address by removing address space corresponding to a memory hole, thereby generating a normalized address when associativity data is allocated to a cache associativity class in a cache directory. The storage circuit is configured to store the normalized address in the cache directory. The de-normalizing circuit is configured to de-normalize the normalized address, thereby generating a de-normalized address, when the associativity data is cast out of the cache directory to make room for a new associativity data. The transmission circuit is configured to send the de-normalized address to the memory system for coherency management.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
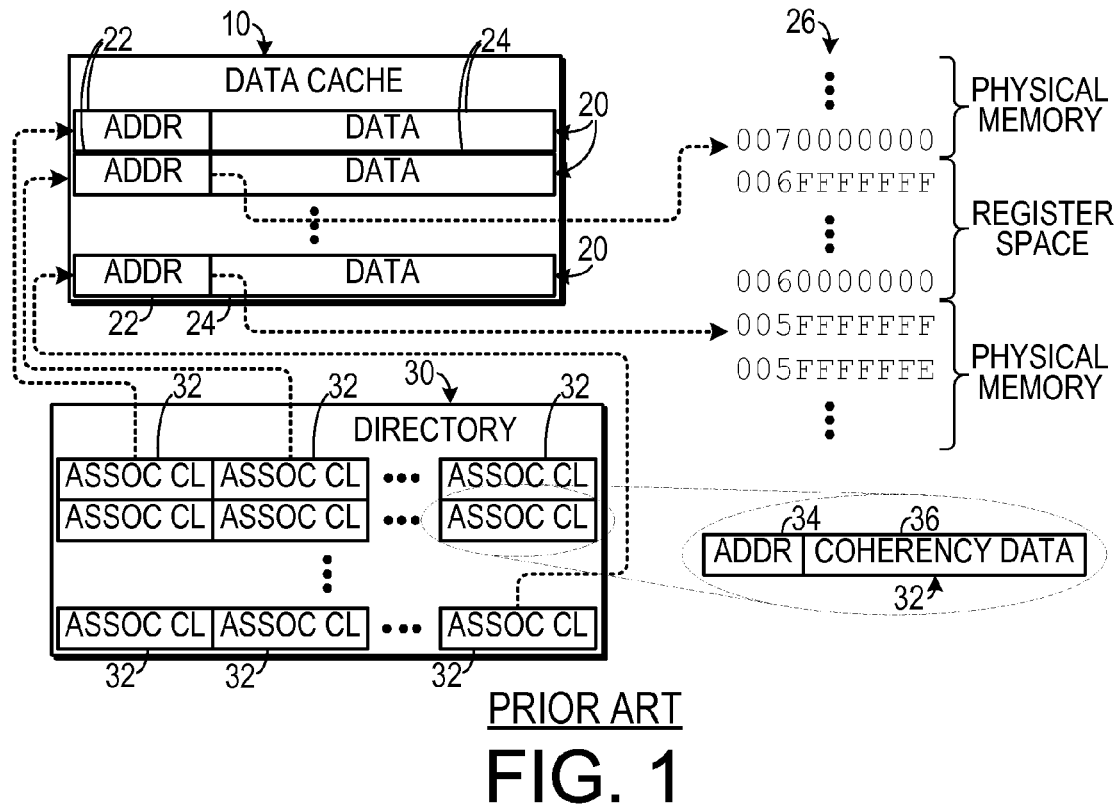
FIG. 1 is a schematic diagram of an existing cache memory system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One embodiment normalizes the system address by subtracting the memory hole when creating the address tag stored in the scalability directory. This additional normalization will reduce the size of an associativity class, increase the capacity of the scalability directory, and improve system performance.

Figure 2:
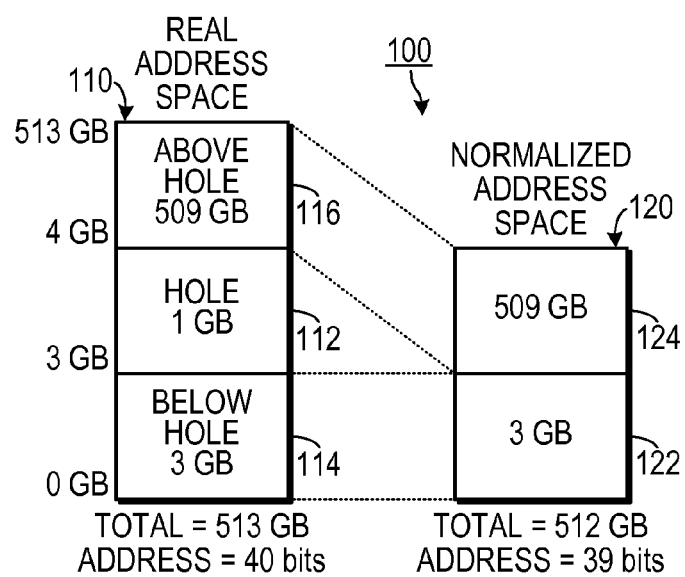
FIG. 2 is a memory space diagram showing normalization of address space.

As shown in FIG. 2, real address space 110 may include an address space hole 112, corresponding to the address space dedicated to fixed registers, an address space 114 below the hole 112 (i.e., having an address range with a value less than the address range of the hole 112) and an address space 116 above the hole (i.e., having an address range with a value greater than the address range of the hole 112). Typically, data stored in the fixed registers is not cached because the registers tend to be accesses at least as quickly as the cache. Because of this, there is no need to accommodate such data in the cache directory (which could be, e.g., a cache scalability directory). Therefore, the real address space 110 can be transformed into normalized address space 120 that includes lower order address space 122 (corresponding to the address space 114 below the hole 112) that is contiguous with higher order address space 124 (corresponding to the address space 116 above the hole 112). Since the address space corresponding to the hole 112 is not included, the normalized address space 120 requires fewer address bits for any given address that is applied to an associativity class. This allows for more associativity classes in a given cache directory, which allows the cache directory to manage a larger cache, or it allows for the use of a smaller cache directory to manage a given cache size.

In one illustrative example (simplified for clarity), if an existing associativity class requires 16 bits and if each line in the directory has 100 bits and if each line includes 10 bits dedicated to error detection and correction (ECC bits), then each line can include five associativity classes and would also have 10 unused bits. If, employing the invention, one bit could be reclaimed from each associativity class through address normalization so that each associativity class included 15 bits (instead of 16 bits), then an additional associativity class can be added in each directory line. Thus, each directory line would employ six associativity classes of 15 bits each and 10 ECC bits, with no unused bits. This represents a 20% increase in the number of associativity classes that may be stored in the directory without adding any additional hardware.

Figure 3:
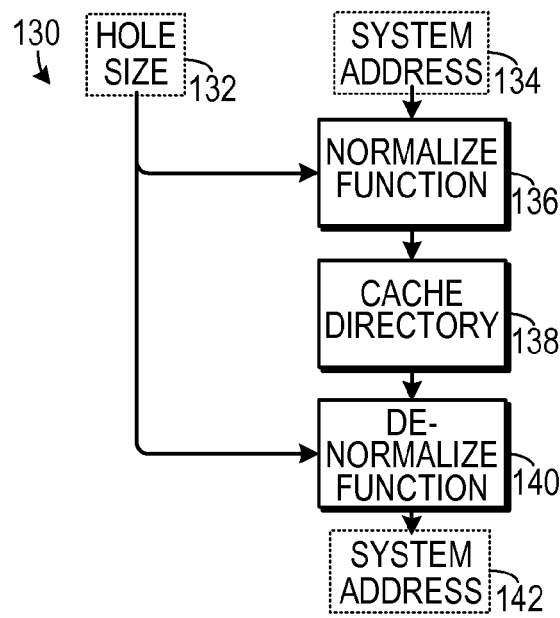
FIG. 3 is a flow diagram showing several stages of a system address.

As shown in FIG. 3, when an original system address 134 is presented to the cache directory and when corresponding associativity data is allocated to an associativity class in the cache directory, the original system address is normalized with a normalize function 136 (which may be implemented in hardware or software, or a combination thereof). The normalize function 136 removes address space corresponding to a memory hole to generate the normalized address. The normalize function 136 is responsive to the hole size 132, which may be hardwired into the normalize function 136, or may be stored in memory. Once the normalized address is generated, it is stored in an associativity class in the cache directory 138, along with corresponding coherency data. When the coherency data stored in an associativity class is to be cast out of the cache directory (e.g., as a result of non-use), a de-normalize function 140 restores the system address 142 by incorporating the address space corresponding to the hole and the de-normalized system address 142 is presented to the memory system for coherency management.

Figure 4A:
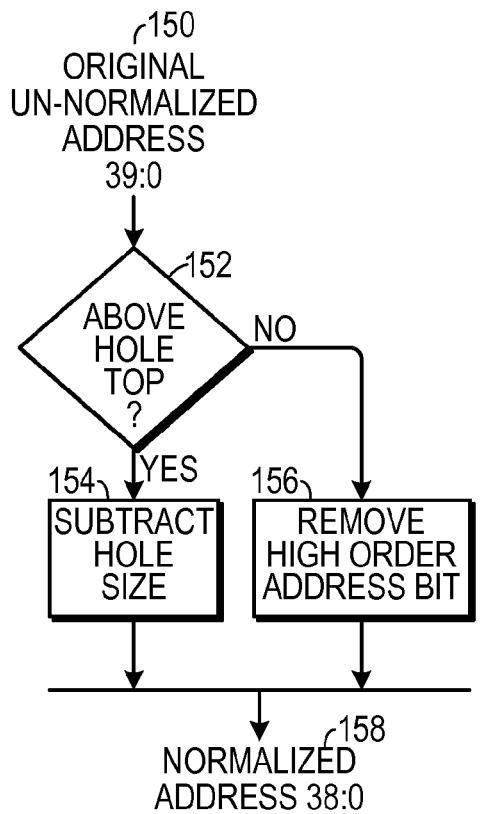
FIG. 4A is a flow diagram showing address normalization.

One method of embodying the normalize function is shown in FIG. 4A, in which a decision 152 evaluates whether the original system address 150 is greater than the maximum address of the hole. If it is, then the hole size is subtracted 154 from the original system address. Otherwise, the highest order address bit (or bits, if the hole is of a size that is represented by more than one bit) is removed 156 from the address. In either case, the result is a normalized address 158 that requires at least one fewer address bit.

Figure 4B:
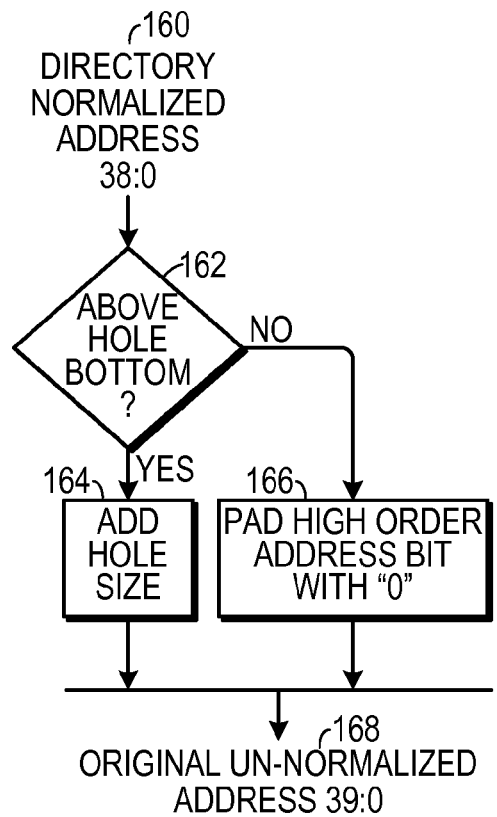
FIG. 4B is a flow diagram showing address de-normalization

One method of embodying the de-normalize function is shown in FIG. 4B, in which a decision 162 evaluates whether the normalized address 160 is greater than the minimum address of the hole. If it is, then the hole size is added 164 to the normalized address. Otherwise the high order address bit (or bits) is padded with a zero. Both cases result in regeneration of the original un-normalized address 168.

Figure 5:
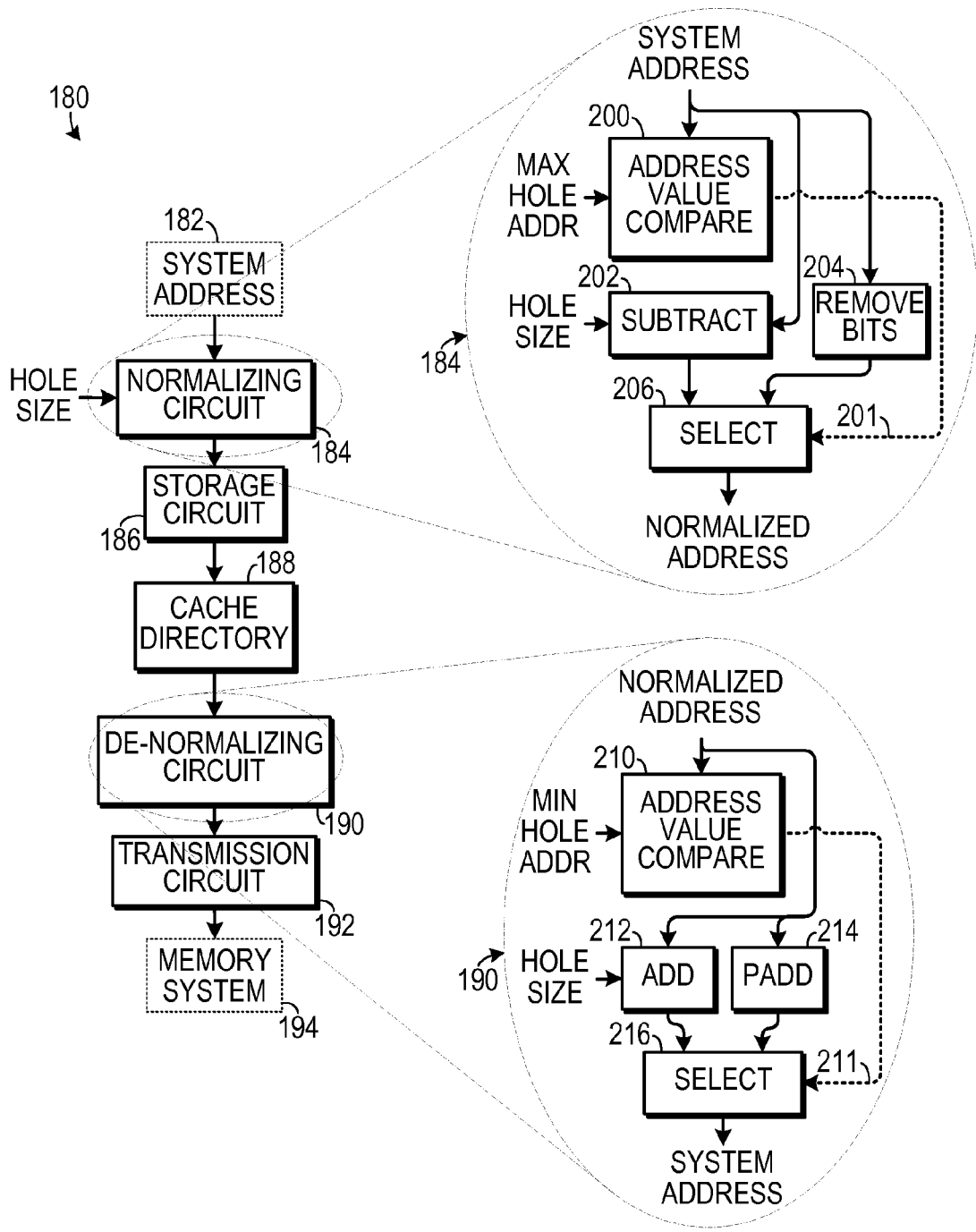
FIG. 5 is a block diagram showing an apparatus for managing cache memory space.

One example of a circuit implementation 180 is shown in FIG. 5, in which a system address 182 that is to be written to an associativity class when associativity data is added to the cache directory 188 is first sent to a normalizing circuit 184. The normalizing circuit 184 passes the normalized address to a circuit 186 that stores the normalized address, along with the associativity data, in the appropriate associativity class. When removing data from an associativity class, the normalized address is passed to a de-normalizing circuit 190 that restores the original system address, which is transmitted via a circuit 192 to the system memory 194.

The normalizing circuit 184 can include a comparator 200 that compares the system address to the maximum hole address and that generates a control signal indicative of the comparison. One data path employs a subtractor 202 to subtract the hole size from the system address, whereas and alternate data path includes a circuit 204 that removes the high order bit (or bits, depending on the size of the hole) from the system address. A selector 206 that is responsive to the control signal 201 selects between the two data paths and outputs the normalized address.

The de-normalizing circuit 190 can include a comparator 210 that compares the normalized address to the minimum hole address and generates a signal 211 indicative of the comparison. In one data path an adder 212 adds the hole size to the normalized address, whereas in another data path a padding circuit 214 pads the highest order bit of the address with a zero (or several zeros if the hole size corresponds to more than one bit). A selector 211 selects between the two data paths based on the value of the control signal 211 and outputs the restored system address.

When a processor accesses a cache, the address used to determine if there is a cache hit must be normalized so that the address used to access the cache directory is of the same format as the address in the cache directory. Typically, the process of normalizing an address for accessing a cache directory would be similar to the address normalization process described above.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of managing a cache directory in a memory system, comprising the actions of:
    a. presenting an original system address to the cache directory when corresponding associativity data is allocated to an associativity class in the cache directory;
    b. normalizing the original system address by removing address space corresponding to a memory hole, thereby generating a normalized address;
    c. storing the normalized address in the cache directory;
    d. de-normalizing the normalized address, thereby generating a de-normalized address, when the associativity data is cast out of the cache directory to make room for new associativity data; and
    e. sending the de-normalized address to the memory system for coherency management.

2. The method of claim 1, wherein the normalizing action comprises the actions of:
    a. determining if the original system address has a value that is greater than a maximum address of the memory hole;
    b. if the address has a value that is greater that the maximum address of the memory hole, then subtracting a size of the memory hole from the address, thereby generating a normalized address;
    c. if the address has a value that is not greater that the maximum address of the memory hole, then removing higher order address bits corresponding to a size of the memory hole, thereby generating the normalized address; and
    d. storing the normalized address in the cache directory.

3. The method of claim 2, wherein the cache directory comprises a cache scalability directory.

4. The method of claim 1, wherein the de-normalizing action comprises the actions of:
    a. determining if the normalized address is above the bottom of the memory hole;
    b. if the normalized address is above the bottom of the memory hole, then adding the size of the memory hole to the normalized address; and
    c. if the normalized address is not above the bottom of the memory hole, then padding a higher order address bit of the normalized address with a zero.

5. The method of claim 1, wherein the memory hole corresponds to address space assigned to fixed registers.

6. A method of increasing cache directory associativity classes, each associativity class including a memory address, comprising the actions of:
    a. determining if an address has a value that is greater than a maximum address of a memory hole;
    b. if the address has a value that is greater that the maximum address of the memory hole, then subtracting a size of the memory hole from the address, thereby generating a normalized address;
    c. if the address has a value that is not greater that the maximum address of the memory hole, then removing higher order address bits corresponding to a size of the memory hole, thereby generating the normalized address; and
    d. storing the normalized address in the cache directory.

7. The method of claim 6, further comprising the action of de-normalizing the normalized address.

8. The method of claim 7, wherein the de-normalizing action comprises the actions of:
    a. determining if the normalized address is above the bottom of the memory hole;
    b. if the normalized address is above the bottom of the memory hole, then adding the size of the memory hole to the normalized address; and
    c. if the normalized address is not above the bottom of the memory hole, then padding a higher order address bit of the normalized address with a zero.

9. The method of claim 6, wherein the cache directory comprises a cache scalability directory.

10. The method of claim 6, wherein the memory hole corresponds to address space assigned to fixed registers.

11. An apparatus for managing a cache directory in a memory system, comprising:
    a. a memory hole size input;
    b. a normalizing circuit configured to normalize an original system address by removing address space corresponding to a memory hole, thereby generating a normalized address when associativity data is allocated to a cache associativity class in a cache directory;
    c. a storage circuit that is configured to store the normalized address in the cache directory;
    d. a de-normalizing circuit that is configured to de-normalize the normalized address, thereby generating a de-normalized address, when the associativity data is cast out of the cache directory to make room for a new associativity data; and
    e. a transmission circuit that is configured to send the de-normalized address to the memory system for coherency management.

12. The apparatus of claim 11, wherein the normalizing circuit comprises:
    a. an address comparison device that determines if the original system address has a value that is greater than a maximum address of the memory hole;
    b. a subtraction device that subtracts a size of the memory hole from the address, thereby generating a normalized address if the address has a value that is greater that the maximum address of the memory hole; and
    c. a bit removing device that removes higher order address bits corresponding to a size of the memory hole, thereby generating the normalized address if the address has a value that is not greater that the maximum address of the memory hole.

13. The apparatus of claim 11, wherein the de-normalizing circuit comprises:
    a. a comparison device that determines if the normalized address is above the bottom of the memory hole;
    b. an adding device that adds the size of the memory hole to the normalized address when the normalized address is above the bottom of the memory hole; and c. a padding device that pads a higher order address bit of the normalized address with a zero when the normalized address is not above the bottom of the memory hole.

14. The apparatus of claim 11, wherein the cache directory comprises a cache scalability directory.

15. The apparatus of claim 11, wherein the memory hole corresponds to address space assigned to fixed registers.

* * * * *